United States Patent
Stark et al.

(10) Patent No.: US 6,655,081 B1
(45) Date of Patent: Dec. 2, 2003

(54) MUSHROOMS

(75) Inventors: Jacobus Stark, Rotterdam (NL); Mark Peter Wach, Allison Park, PA (US); Edith Magda Lucia Geijp, Pijnacker (NL); Ferdinand Theodorus Jozef Van Rijn, Delft (NL); Lori Ann MacDonald, Valencia, PA (US); Jeffrey Wayne Smathers, Kittanning, PA (US)

(73) Assignees: DSM N.V., Te Heerlen (NL); Sylvan, Inc., Saxonburg, PA (US)

( * ) Notice: Subject to any disclaimer, the term of this patent is extended or adjusted under 35 U.S.C. 154(b) by 0 days.

(21) Appl. No.: 09/608,186

(22) Filed: Jun. 30, 2000

Related U.S. Application Data

(60) Provisional application No. 60/141,953, filed on Jul. 1, 1999.

(51) Int. Cl.[7] .................................................. A01G 1/04
(52) U.S. Cl. .......................................... 47/1.1; 800/297
(58) Field of Search .............................. 47/1.1; 800/297

(56) References Cited

U.S. PATENT DOCUMENTS

| | | | |
|---|---|---|---|
| 4,608,775 A | * 9/1986 | Elliott et al. ................... | 47/1 R |
| 5,503,647 A | * 4/1996 | Dahlberg et al. .............. | 47/1.1 |
| 5,552,151 A | * 9/1996 | Noordam et al. ........... | 424/439 |

FOREIGN PATENT DOCUMENTS

WO  WO 95/08918  4/1995

OTHER PUBLICATIONS

Mukherjee et al., 1993 "Natural resistance of the mycelial culture of the mushroom, Panaeolus papillonaceus, towards growth inhibition by polyene antibiotics" Current Microbiology, 27(1), 1–4.

Oita, et al., 1997 "Flutolanil Resistance as a Genetic Marker of Coprinus cinereus Strains" Biosci. Biotech. Biochem, 61(12), 2145–2147.

"Treatment of mycelium from beta lactam antibiotics prodn.–involves mixing wet mycelium with hydrated lime to degrade lactam and give prod. for protein feed, soil dressing or mushroom growth" Research Disclosure, 360(52), 1994.

"Control of harmful microorganisms in cultivation of edible mushrooms—by contact with liq. contg. 1–(2–(2, 4–dischlorophenyl) 2–(2–propenyloxy)ethyl) 1H–imidazole" & JP 60 259127 A (Abstract) 1985.

Database Biosis Online!, Biosciences Information Service, Philadelphia, PA, US; M. Mukherjee et al.: "Natural resistance of the mycelial culture of the mushroom, Paneolus papillonaceus, towards growth inhibition by polyene antibiotics" retrieved from EPOQUE, accession No. PREV199396037774, XP002153521, abstract & Current Microbiology, vol. 27, No. 1, 1993, pp. 1–4.

O. Shigeru et al.: "Flutolanil Resistance as a Genetic Marker of Coprinus cinereus Strains," Bioscience Biotechnology Biochemistry, vol. 61, No. 12, 1997, pp. 2145–2147, XP002153520; Japan Soc. for Bioscience, Biotechnology and Agrochem. Tokyo, JP, ISSN: 0916–8451, p. 2145, col. 1; table 1.

\* cited by examiner

*Primary Examiner*—Peter M. Poon
*Assistant Examiner*—Joan M. Olszewski
(74) *Attorney, Agent, or Firm*—Morrison & Foerster LLP

(57) ABSTRACT

A substrate for mushroom cultivation comprises a polyene fungicide, in particular, natamycin. Mushrooms cultivated in such substrates can be harvested earlier than mushrooms cultivated in substrates which do not include polyene fungicides. Alternatively, mushrooms grown in a substrate comprising a polyene fungicide achieve a greater size than mushrooms grown for the same amount of time in a substrate which does not include a polyene fungicide.

18 Claims, No Drawings

MUSHROOMS

This application claims the benefit of application No. 60/141,953, filed Jul. 1, 1999.

FIELD OF THE INVENTION

The present invention relates to growth substrates for mushrooms.

BACKGROUND TO THE INVENTION

The cultivation of edible mushrooms is a difficult and complex process. Due to many uncontrollable parameters the yield is rather unpredictable, leading to considerable economic losse.

In the past, several studies have been carried out to develop more defined growth substrates. These are still mostly in solid form and generally compost is used as the substrate for growing mushrooms. Raw materials of compost are water, straw (mostly wheat), manure (mostly horse and/or poultry manure) and calcium sulfate. Also, other raw materials which improve the fermentation may be added. Of course, the quality of the compost is related to the quality of the raw materials, the composition of the microflora and the conditions of the fermentation process. During composting a substrate should develop, which is optimal for the growth of mushroom mycelium and formation of the mushrooms.

However, composts vary in their composition enormously. For example, the composition of especially the manure and the micro-flora may differ considerably. The quality of the straw is determined by the growth conditions of the crop, the type of straw (e.g. wheat, rye, barley, oats, rice), the age of the straw, the herbicides used in the field and many other factors. Also, in most cases the fermentation process is rather uncontrolled. Composting is a complex fermentation in which many micro-organisms are involved. Both aerobic and anaerobic and both mesophilic and thermophilic processes take place. Compost is not a sterile product and thus, it contains a wide variety of micro-organisms, which may influence the development of the mushrooms during cultivation in a negative or perhaps even in a positive way. Micro-organisms, which may affect the yield in a negative way, should not develop during the cultivation or ideally should not be present at all.

After fermentation, mostly a mild pasteurisation and final cooling down to 25–30° C., the compost is inoculated with mushroom spawn. Growing mycelium has a strong antagonistic effect on unwanted mould species and therefore inoculation should take place as soon as possible. Spawn is mostly prepared by inoculating mushroom spores or mycelium on a carrier, e.g. rye grains. An advantage of using a carrier, such as rye, is that the spawn can be mixed through the compost quite easily. Alternatively an old compost can be mixed with a new compost. After an incubation period of about two weeks the growth is stopped by lowering the temperature, after which the spawn is ready for use.

After inoculation of the compost with the spawn, mycelial growth is started by incubating the compost under more or less controlled conditions. During this process additional nutrients, e.g. soy bean products, may be added to the compost. After 12–20 days the mycelium has developed sufficiently and the compost is ready for use. The exact duration of this process depends on many factors such as the mushroom species, the quality of the compost, the temperature and the relative humidity.

Over the years, several new mushroom species have been cultivated for commercial purposes. Examples of such new species are *Pleurotus ostreatus* and Shiitake mushrooms. Each species requires its own specific cultivation conditions. The most important species is *Agaricus bisporus* and varieties of this species, such as *Agaricus bitorquis*. In case of cultivation of Agaricus species the compost is usually placed into boxes. To stimulate formation of the fruiting bodies the compost is covered with a so-called casing, which is often a layer of peat. Following a specific temperature regime and arranging the relative humidity and $CO_2$ concentration of the air stimulates the formation of mushrooms. It is also important to supply sufficient water.

The mushrooms are harvested approximately 21, 29 and 35 days after the compost is covered with the casing. However the exact time of harvesting is influenced by many factors and may differ considerably.

Clearly, moulds cause many problems in the mushroom industry. During cultivation, growth conditions are optimal for both mushrooms and unwanted mould species. Moulds are always present in both the compost and the environment. Compost of bad quality may contain a too high amount of moulds and unwanted moulds may also be introduced by contamination via equipment, boxes, the air, insects, etc.

Unwanted moulds compete with the mushroom mycelium and thus inhibit its development. This may of course lead to lower yields. Other types of moulds are parasites which can damage the mushroom mycelium or fruiting bodies and ultimately may even destroy the whole harvest. Examples of unwanted mould species are Trichoderma species (e.g. *T. harzianum, T. viride, T. koningii*), Verticillium species (e.g. *V. fungicola* var. *fungicola, V. fungicola* var. *aleophilum*), Chaetomium species, *Peziza oasracoderma, Sporendonema purpurascens,* Aspergillus species, Penicillium species, Mycogone species (e.g. *Mycogone pernicosa*) and Dactylum species (e.g. *Dactylum dendroides*).

Natamycin has been used to prevent fungal growth on food products, such as cheeses and sausages, for over 30 years. Such food products are treated by immersion in or by spraying with a suspension of natamycin in water. Alternatively cheeses and sausages can be covered by an emulsion of a polymer in water containing natamycin. Usually, aqueous suspensions for immersion or spraying treatments contain 0.1% to 0.2% w/v of natamycin, while polymer emulsions for coating purposes contain 0.01% to 0.05% w/v of natamycin.

Treatment with natamycin is highly effective in preventing fungal growth on food products. The MIC (Minimal Inhibitory Concentration) of most fungi for natamycin is less than 20 ppm, while its solubility in water is from 30–50 ppm. Also, mycelium of most mushroom species, e.g. *A. bisporus,* is inhibited by natamycin.

Only the dissolved fraction of natamycin has anti-fungal activity. Elimination of dissolved natamycin is generally compensated for sufficiently by dissolution of natamycin from the crystals and by diffusion of dissolved natamycin to the site of contamination. Thus, under normal conditions, natamycin will protect food products against fungal spoilage for a certain period of time. However, if the amount of fungi present in the environment is too high, for example due to less hygienic conditions, the availability of active dissolved natamycin will become a limiting factor.

SUMMARY OF THE INVENTION

Unexpectedly, the present inventors have found that treatment of a growth substrate for mushrooms with a polyene fungicide, e.g. natamycin, improves the growth and development of mushrooms in such a spectacular way that harvesting can occur at least one day earlier. Moreover the yield of the harvest is found to increase.

According to the present invention there is thus provided a substrate for use in mushroom cultivation comprising a polyene fungicide.

The invention also provides:
  a process for the preparation of a substrate of the invention, which process comprises adding a polyene fungicide to a substrate for use in mushroom cultivation;
  a supplement for use in mushroom cultivation comprising at least one mushroom additive composition and a polyene fungicide;
  a process for the preparation of a supplement of the invention, which process comprises mixing at least one mushroom additive composition with a polyene fungicide;
  a process for supplementing a substrate for use in mushroom cultivation, which process comprises adding a supplement of the invention to the said substrate;
  a process for the cultivation of mushrooms, which process comprises:
    (i) providing a substrate for mushroom cultivation;
    (ii) inoculating the substrate with mushroom spores or mycelium;
    (iii) adding a polyene fungicide or a supplement of the invention;
    (iv) applying conditions to stimulate growth of the mushrooms; and
    (v) harvesting the mushrooms;
  a process for the cultivation of mushrooms, which process comprises:
    (i) providing a substrate for mushroom cultivation comprising a polyene fungicide;
    (ii) inoculating the substrate with mushroom spores or mycelium;
    (iii) applying conditions to stimulate growth of the mushrooms; and
    (iv) harvesting the mushrooms.
  mushrooms obtainable by a process for the cultivation of mushrooms or which have been exposed to or impregnated with a polyene fungicide;
  use of a polyene fungicide in a substrate for mushroom cultivation or for promoting mushroom growth.

DETAILED DESCRIPTION OF THE INVENTION

Substrates and processes of the invention are applicable to the cultivation of any species of mushroom. Preferred species include *Pleurotus ostreatus*, Shiitake mushrooms and *Agaricus bisporus* and in particular varieties of the latter species, such as *Agaricus bitorqius*. The growth substrate may be a compost, a casing or top-layer, a defined growth substrate or any other growth substrate suitable for cultivation of mushrooms. Raw materials of compost include water, straw (e.g. wheat, rye, barley, oats or rice), manure (usually from horse and/or poultry), minerals such as calcium sulphate (or other calcium containing compounds) phosphor, magnesium, sulphur and potassium, nitrogen sources such as proteins, amino acids, ureum, $NH_4^+$; vitamins such as thiamine and biotin and additional nutrient compositions such as meal, grid and flour for example soy flour, corn gluten meal, potato protein, peanut meal, linseed meal, cotton seed, meat and bone meal, beneficial for growth of the mushroom mycelium and fruiting bodies.

After the fermentation process, the compost is inoculated with mushroom spawn. The spawn can be prepared by any method known in the art. Usually, the spawn is prepared by inoculating the mushroom mycelium on a carrier, e.g. rye grain.

The casing may contain any suitable compound. Examples of raw materials of the casing are peat, clay, marl, calcium sulphate, or "schuimaarde", which is prepared from waste of the sugar/sugar beet industry.

The anti-fungal agent is a polyene fungicide. Examples of polyene fungicides include natamycin, nystatin, lucensomycin and ampohotericin B. The preferred polyene compound is natamycin. Also, combinations of polyene fungicides with each other or with other fungicides may be used. Also included in this invention are derivates of polyene fungicides for example salts of polyene fungicides (e.g. calcium- and barium salts of natamycin), solvates of polyene fungicides (e.g. methanol solvate of natamycin) and crystal modifications of polyene fungicides (e.g. as described in European Patent Publication No. 670676, (1995)).

A substrate of the invention may comprise any combination of said growth substrates for mushrooms and said polyene fungicides or modified forms thereof.

The polyene fungicide, e.g. natamycin, can be added in an effective amount to the growth medium for mushrooms as a powder, an aqueous composition (which 30 may be a suspension), an aqueous composition using alkaline or acidic conditions or dissolved in a suitable solvent system, such as methanol, ethanol, propanol, glycerol, glycol, methoxy ethanol or ethoxy ethanol, or glacial acetic acid. Also, suitable solubilizers can be used. The polyene fungicide can also be applied on a carrier by well-known methods. Furthermore, any preparation containing polyene fungicides, e.g. natamycin, can be used in this invention. Examples of such polyene fungicide preparations are the commercially available powder compositions sold under the trademarks Delvocid® or Natamax®, These compositions contain about 50% (w/w) natamycin. It will be appreciated that all conventional ways of adding the natamycin are included in the present invention. Examples are spraying on the compost/casing, physically mixing of natamycin with the compost/casing, soaking of compost/casing with a natamycin containing liquid. The natamycine can be sprayed on the casing and/or compost. Advantageously 1–200 mg of natamycin per $m^2$ is added, preferably 1–100 and more preferably 3–30 mg/$m^2$ of natamycin is added to the casing and/or compost. It has been found that least the top layer of the compost or casing advantageously comprises natamycin in a concentration of 0.05–50 mg/kg, preferably 0.2–40 and more preferably 0.3–30 mg of natamycin is present per kg of the top layer of the compost or casing. In general the natamycin containing layer is 1–10 cm, preferably 2–5 cm thick.

The polyene fungicide can be added to the growth substrate at any appropriate time. When applied as a powder, it can be mixed through the growth substrate, e.g. the casing and/or the compost, before, during or after fermentation. The polyene fungicide may also be an ingredient of any composition added to the growth substrate, e.g. the spawn, agents to prevent microorganism, insects, memathodes, mites and unwanted fungi, or the extra nutrients (compositions such as meal, grid and flour for example soy flour, corn gluten meal, potato protein, peanut meal, linseed meal, cotton seed, meat and bone meal), which are often added during or after the composting process. Thus, the invention also includes any supplements, e.g. spawn, antimicrobial agents or nutritional compositions (e.g. soybean products), containing polyene fungicides.

The concentration of polyene fungicide in a supplement will typically be higher than that present in a substrate, so that when the supplement is added to the substrate the concentration of the polyene fungicide falls to an appropriate effective concentration.

Alternatively, the polyene fungicide can also be added to the casing, which is often used to cover the compost layer and promotes development of the fruiting bodies.

When applied as an aqueous suspension or a solution in e.g. a solvent, the polyene fungicide can be applied as described above (i.e. mixed directly into the mushroom growth medium). However, liquid compositions can also be sprayed over the surface of the compost and/or casing at any suitable moment. Examples of suitable moments are before cultivation of the mushrooms (during/after mycelial growth in the growth substrate) or just after harvesting, e.g. between the first and second or second and third harvest. Spraying can be carried out by any method known in the art, e.g. by using a simple sprayer or spray equipment, which is used in the mushroom industry.

The following Example illustrates the invention:

EXAMPLE 1

This example describes the effect of natamycin on the growth of mushrooms.

A saturated solution of 30 ppm of natamycin in water was prepared using well known methods.

Compost inoculated with spawn of *A. bisporus* was prepared using well known methods. Two boxes of approximately 50×50 cm were filled with the compost, which was then covered with a casing using well known methods. Directly after covering with the casing (day 1), one box (no. 1) was sprayed with 1 liter of water, and the other box (no. 2) was sprayed with 1 liter of a solution containing 30 ppm of natamycin in water. Mycelial growth was then induced by incubating the boxes for 18 days under standard conditions. On day 18 box no. 1 was sprayed with 0.5 liter of water, while box no. 2 was sprayed with 0.5 liter of a solution containing 30 ppm natamycin in water. The boxes were then incubated under standard conditions to induce formation of mushrooms. After the first and second harvest 2 liters of water was sprayed on the surface of box no. 1, while box no. 2 was treated with 2 liters of the natamycin solution.

In case of the control (box no. 1) mushrooms could be harvested on day 21, day 29 and day 35. In case of spraying with said natamycin solution (box no. 2) the mushrooms did grow considerably faster and could be harvested 1–2 days earlier. The quality of the mushrooms was not affected in a negative way by the natamycin treatments.

This example clearly demonstrates that treatment of the growth substrate with natamycin speeds up the growth of mushrooms in such a way that harvesting can occur at least 1 day earlier. Alternatively the mushrooms can grow larger in the same period of time.

EXAMPLE 2

This example describes the effect of natamycin on the yield of mushrooms. Tubs having an area of 0.26 m² were filled with commercially prepared pasteurized mushroom substrate inoculated with spawn (seed) of the commercial button mushroom *Agaricus bisporus*. Following colonization by the mushroom fungus, the substrate was covered by a layer of peat moss, mixed with limestone (the casing layer) and further incubated under well known standard conditions until mycelial strands were visible on the surface. Fruiting bodies were initiated by manipulating the external environment using methods well known in the industry.

9 tubs were treated five days prior to the first flush by applying an aqueous solution containing 10 ppm of natamycin, as a control 9 tubs were treated the same way however without natamycin. The aqueous solution was applied at a rate of 1.84 liter per square meter and the mushroom beds were allowed to continue growing.

After 3 flushes, it was demonstrated that a statistically significant yield increase could be identified as compared to the untreated control. The average yield of the untreated beds was 3.40 pounds per square feet, while the average yield of the beds treated with natamycin was 3.94 pounds per square feet. The quality of all musrooms was good.

This result clearly demonstrate that treatment of natamycin enhances the yield of the mushrooms considerably.

EXAMPLE 3

This example demonstrates the effect of natamycin against four important mushroom pathogens: the moulds *Mycogone pernicosa, Trichoderma harzianum, Dactylium dendroides* and *Verticillium fungicola*. Each of these organisms were field isolates.

Potato Dextrose Agar plates containing 0, 10 and 20 ppm of natamycin and mould suspensions were prepared using well known methods.

The freshly prepared suspensions were dilluted to final concentrations of $10^4$ Colony Forming Units/ml.

10 μl of each mould suspensions was inoculated in a spot on the agar plates (in duplo). The plates were incubated for 5 days at 25° C.

After 5 days of incubation on the control plates containing no natamycin, clear colonies were formed.

In case of plates containing 10 ppm of natamycin inoculated with *Verticillium fungicola* only some slight growth was observed, while on the plates containing 20 ppm of natamycin no growth was observed. In case of the three other mould species no growth was observed on plates containing 10 and 20 ppm of natamycin.

These results clearly demonstrate that natamycin inhibits the growth of these four relevant mushroom pathogens.

What is claimed is:

1. A process for the cultivation of mushrooms, which process comprises:
   (i) providing a mushroom cultivation substrate;
   (ii) inoculating the substrate with mushroom spores or mycelium;
   (iii) adding at least one polyene fungicide or a supplement containing at least one polyene fungicide;
   (iv) applying conditions to stimulate growth of the mushrooms; and
   (v) harvesting the mushrooms.

2. The process according to claim 1 wherein the mushroom spores or mycelium are present on a carrier.

3. process according to claim 1, wherein the polyene fungicide is natamycin, nystatin, lucensomycin or amphotericin B.

4. A process for the cultivation of mushrooms, which process comprises:
   (i) providing a substrate for mushroom cultivation comprising at least one polyene fungicide;
   (ii) inoculating the substrate with mushroom spores or mycelium;

(iii) applying conditions to stimulate growth of the mushrooms; and (iv) harvesting the mushrooms.

5. The process according to claim 4 wherein the substrate is a compost based substrate.

6. The process according to claim 4 wherein the mushroom spores or mycelium are present on a carrier.

7. process according to claim 4 wherein the mushroom spores or mycelium are Agaricus or Pleurotus spores or mycelium.

8. process according to claim 4, wherein the polyene fungicide is natamycin, nystatin, lucensomycin or amphotericin B.

9. A process for accelerating the growth of mushrooms comprising:

adding at least one polyene fungicide or a supplement containing at least one polyene fungicide to a mushroom cultivation substrate inoculated with mushroom spores or mycelium, wherein the presence of the at least one polyene fungicide accelerates the growth of the mushrooms.

10. The process according to claim 9 wherein the substrate is a compost based substrate.

11. The process according to claim 9 wherein the mushroom spores or mycelium are present on a carrier.

12. The process according to claim 9, wherein the mushroom spores or mycelium are Agaricus or Pleurotus spores or mycelium.

13. The process according to claim 9, wherein the polyene fungicide is natamycin, nystatin, lucensomycin or amphotericin B.

14. A process for accelerating the growth of mushrooms comprising:

inoculating a substrate for mushroom cultivation comprising at least one polyene fungicide with mushroom spores or mycelium, wherein the presence of the at least one polyene fungicide accelerates the growth of the mushrooms.

15. The process according to claim 14 wherein the substrate is a compost based substrate.

16. The process according to claim 14 wherein the mushroom spores or mycelium are present on a carrier.

17. The process according to claim 14, wherein the mushroom spores or mycelium are Agaricus or Pleurotus spores or mycelium.

18. The process according to claim 14, herein the polyene fungicide is natamycin, nystatin, lucensomycin or amphotericin B.

* * * * *